Nov. 3, 1925.
A. HEBERT
STALL FLOOR
Filed April 25, 1925
FIG_1_
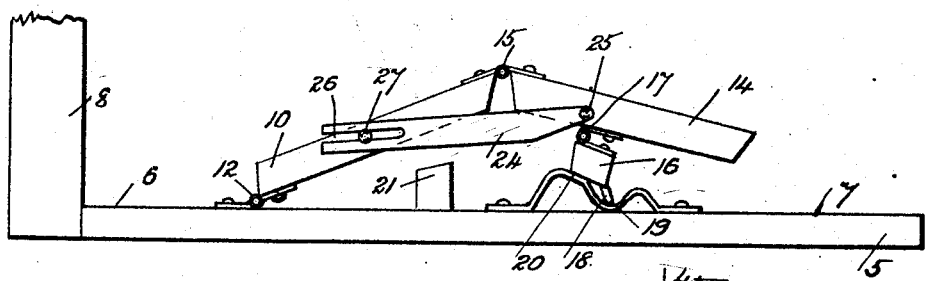
FIG_2_
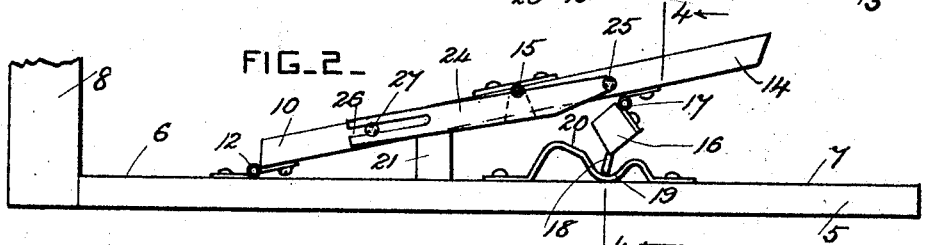
FIG_3_
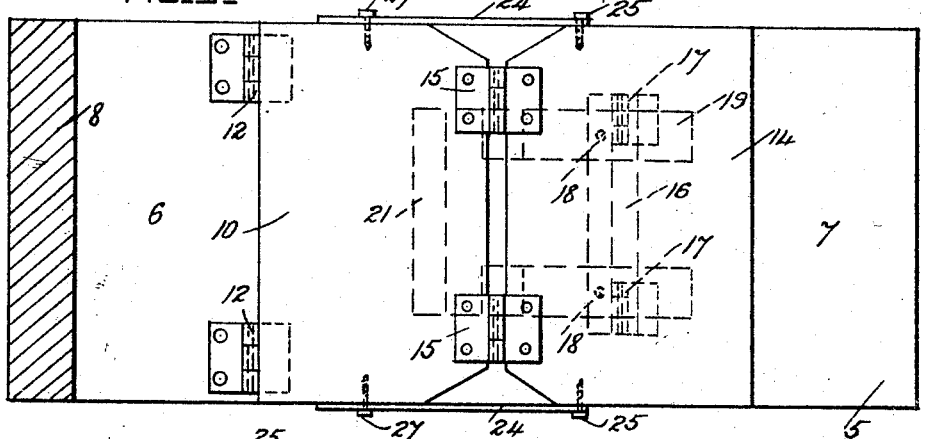
FIG_4_
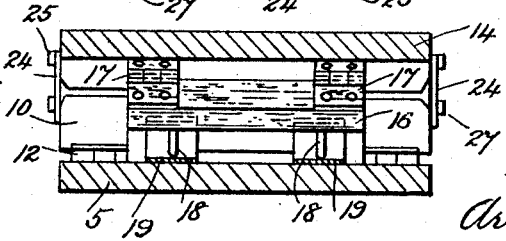
Inventor,
Arsene Hebert
by Herbert W. Jenner
Attorney Patented Nov. 3, 1925.

1,560,160

UNITED STATES PATENT OFFICE.

ARSENE HEBERT, OF DERRY, NEW HAMPSHIRE.

STALL FLOOR.

Application filed April 25, 1925. Serial No. 25,787.

*To all whom it may concern:*

Be it known that I, ARSENE HEBERT, a subject of the King of Great Britain and Ireland, residing at Derry, in the county of Rockingham and State of New Hampshire, have invented certain new and useful Improvements in Stall Floors, of which the following is a specification.

This invention relates to the floors of stalls used for cows and other similar animals; and it consists in the novel construction and combination of the parts hereinafter fully described and claimed whereby the animal is prevented from lying down, it being in many instances desirable to prevent it from doing so.

In the drawings, Figure 1 is a side view of a stall floor constructed according to this invention and showing it in its normal position. Fig. 2 is a similar view, but shows the rear flap raised. Fig. 3 is a plan view of the stall floor. Fig. 4 is a cross-section on line 4—4 in Fig. 2.

The main floor 5 of the cow barn is flat, and has front and rear surfaces 6 and 7 respectively on which the front and rear legs of the animal are positioned. A wall 8 and a manger may advantageously be arranged at the front end of the floor.

A front flap 10 is pivoted to the front end portion of the floor by hinges 12, and a rear flap 14 is pivoted to the rear edge of the front flap by hinges 15. The rear flap has a rocker bar 16 pivoted to its underside by hinges 17, and arranged to the rear of its hinges 15.

The rocker bar 16 has two rocker pins 18 which project downwardly from its lower part and bear upon corrugated guide plates 19. The plates 19 are secured to the main floor 5 under the rear flap, and the rear sides 20 of their corrugations form supports against which the lower side of the rocker bar rests when the parts are in their normal positions as shown in Fig. 1. A stop bar 21 is secured to the main floor 5 under the front flap to limit its downward movement.

The flaps are normally arranged at an angle to each other, as shown in Fig. 1, and they project upwardly between the front and rear legs of the animal. A guard plate or bar 24 is pivoted to the side edge of the rear flap by a pin 25, and has a slot 26 in its free end portion which slides over a pin 27 which projects from the side edge of the front flap. These guard plates are alike at each side of the flaps, and they extend over the angles between the flaps, and prevent adjacent animals from getting their legs under the flaps, when there are no partitions between the animals in the cow barn.

When an animal tries to lie down, and its weight comes upon the hinged joint between the front and rear flaps, the front flap is pressed down onto its stop 21, and the rocker bar is tilted on its rocker pins so that the rear flap is forced upwardly, as shown in Fig. 2, to a position substantially in line with the front flap. The rising of the rear flap forces the animal to get up again, and in so doing it steps on the rear flap and automatically depresses it, so that the rocker bar is tilted in the reverse direction, and the flaps are restored to their normal positions, as shown in Fig. 1.

What I claim is:

1. A stall floor, a front flap having its front end pivoted to the stall floor, a rear flap pivoted to the front flap and normally arranged at an angle to it, and means which support the flaps from the stall floor and automatically force the rear flap upwardly when the pivoted joint portions of the flaps are depressed.

2. A stall floor, a front flap having its front end pivoted to the stall floor, a rear flap pivoted to the front flap and normally arranged at an angle to it, and a rocker bar hinged to the underside of the rear flap and supporting the flaps when in their normal positions.

3. A stall floor, a front flap having its front end pivoted to the stall floor, a rear flap pivoted to the front flap and normally arranged at an angle to it, a rocker bar hinged to the underside of the rear flap and provided with downwardly projecting rocker pins, and corrugated guide plates secured to the stall floor, the said rocker bar and its pins being in engagement with the corrugations of the said plates and the rocker bar being normally arranged to rest against the rear sides of the corrugations.

4. A stall floor provided with pivoted flaps as set forth in claim 1, and having also a stop arranged under the front flap to limit its downward movement.

5. A stall floor provided with pivoted flaps as set forth in claim 1, and having also a guard pivoted to the side edge of one flap and extending over the angle between the flaps and slidably connected with the other flap.

6. A stall floor provided with pivoted flaps as set forth in claim 1, and having also a guard plate pivoted to the side edge of the rear flap and having a longitudinal slot in its free end portion, and a pin projecting from the front flap and engaging with the said slot and supporting the guard plate over the angle between the flaps.

In testimony whereof I affix my signature.

ARSENE HEBERT.